(12) United States Patent
Kim et al.

(10) Patent No.: US 11,559,007 B2
(45) Date of Patent: Jan. 24, 2023

(54) FLOWERPOT

(71) Applicant: REPUBLIC OF KOREA(MANAGEMENT: RURAL DEVELOPMENT ADMINISTRATION), Jeollabuk-do (KR)

(72) Inventors: Jae Soon Kim, Jeollabuk-do (KR);
Seung Won Han, Jeollabuk-do (KR);
Na Ra Jeong, Jeollabuk-do (KR);
Gyung-Mee Kim, Daejeon (KR);
Sun-Jin Jeong, Jeollabuk-do (KR);
Hye-Sook Jang, Gyeonggi-do (KR)

(73) Assignee: REPUBLIC OF KOREA(MANAGEMENT: RURAL DEVELOPMENT ADMINISTRATION), Jeollabuk-do (KR)

( * ) Notice: Subject to any disclaimer, the term of this patent is extended or adjusted under 35 U.S.C. 154(b) by 19 days.

(21) Appl. No.: 16/761,242

(22) PCT Filed: Oct. 1, 2018

(86) PCT No.: PCT/KR2018/011663
§ 371 (c)(1),
(2) Date: May 2, 2020

(87) PCT Pub. No.: WO2019/088460
PCT Pub. Date: May 9, 2019

(65) Prior Publication Data
US 2020/0352107 A1 Nov. 12, 2020

(30) Foreign Application Priority Data
Nov. 3, 2017 (KR) .......................... 10-2017-0145835

(51) Int. Cl.
*A01G 9/02* (2018.01)
*A01G 27/02* (2006.01)
(Continued)

(52) U.S. Cl.
CPC ............... *A01G 9/02* (2013.01); *A01G 27/06* (2013.01); *A01G 27/008* (2013.01); *A01G 27/02* (2013.01)

(58) Field of Classification Search
CPC ........ A01G 9/02; A01G 27/06; A01G 27/008; A01G 27/02
See application file for complete search history.

(56) References Cited

U.S. PATENT DOCUMENTS 4,183,175 A * 1/1980 Magee ................... A01G 27/00
47/79
4,207,705 A * 6/1980 Errede ................... A01G 27/00
264/127

(Continued)

FOREIGN PATENT DOCUMENTS

CN 1220818 A * 6/1999
CN 1286901 3/2001

(Continued)

OTHER PUBLICATIONS

International Search Report for PCT/KR2018/011663 dated Apr. 2, 2019 and its English translation from WIPO (now published as WO2019/088460).

(Continued)

*Primary Examiner* — Son T Nguyen
(74) *Attorney, Agent, or Firm* — Ladas & Parry, LLP (57) ABSTRACT

A flowerpot is disclosed. The flowerpot includes a main body configured to provide a planting space in which an upper portion is open and a central portion is passed through by a through portion in a front and rear direction, a self- (Continued)

watering module installed in the through portion to form water by condensing moisture in the air, and a water supply hole provided on a bottom of the through portion so as to guide the water formed by the self-watering module to the planting space provided in a lower side of the through portion.

15 Claims, 7 Drawing Sheets

(51) Int. Cl.
*A01G 27/06* (2006.01)
*A01G 27/00* (2006.01)

(56) References Cited

U.S. PATENT DOCUMENTS

| | | | | |
|---|---|---|---|---|
| 4,975,251 | A * | 12/1990 | Saceman | B01D 53/85 422/124 |
| 5,046,282 | A * | 9/1991 | Whitaker | A01G 27/003 47/79 |
| 5,180,552 | A * | 1/1993 | Saceman | B01D 53/85 422/1 |
| 5,277,877 | A * | 1/1994 | Jeffrey | A61L 9/122 47/66.6 |
| 5,433,923 | A * | 7/1995 | Wolverton | B01D 53/85 422/121 |
| 5,782,035 | A * | 7/1998 | Locke | A01G 27/00 47/79 |
| 6,848,483 | B1 * | 2/2005 | Atkinson | A01G 27/02 137/393 |
| 2010/0139161 | A1 | 6/2010 | Porter | |
| 2011/0036006 | A1 * | 2/2011 | Griebel | A01G 27/06 47/81 |
| 2012/0198767 | A1 | 8/2012 | Hansen | |
| 2015/0040471 | A1 * | 2/2015 | Hooper | A01G 27/04 47/48.5 |
| 2021/0127606 | A1 * | 5/2021 | Graffius | A01G 27/02 |

FOREIGN PATENT DOCUMENTS

| | | |
|---|---|---|
| CN | 202085530 | 12/2011 |
| CN | 203087083 | 7/2013 |
| CN | 103385124 | 11/2013 |
| CN | 104956960 | 10/2015 |
| CN | 107047103 | 8/2017 |
| CN | 207443607 | 6/2018 |
| EP | 2 727 459 | 5/2014 |
| JP | 53-117439 U | 9/1978 |
| JP | 54-120443 U | 8/1979 |
| JP | 56-15365 U | 2/1981 |
| JP | 63-160527 | 7/1988 |
| JP | 2000-209965 | 8/2000 |
| JP | 2003-287316 | 10/2003 |
| JP | 2012-100614 | 5/2012 |
| JP | 2014-508538 | 4/2014 |
| KR | 200350495 Y1 * | 5/2004 |
| KR | 200353522 Y1 * | 6/2004 |
| KR | 10-2007-0093720 | 9/2007 |
| KR | 10-2013-0000812 | 1/2013 |
| KR | 10-1388951 | 4/2014 |
| KR | 10-1398536 | 5/2014 |
| KR | 10-2015-0021972 | 3/2015 |
| KR | 10-2017-0025051 | 3/2017 |
| KR | 20-2017-0001710 | 5/2017 |
| RU | 2108709 | 4/1998 |

OTHER PUBLICATIONS

Written Opinion of the International Searching Authority for PCT/KR2018/011663 dated Apr. 2, 2019 and its English machine translation by Google Translate (now published as WO2019/088460).

Office Action dated Apr. 27, 2021 for Japanese Patent Application No. 2020-544719 and its English translation provided by Applicant's foreign counsel.

International Preliminary Report on Patentability (Chapter I) dated May 5, 2020 for PCT/KR2018/011663 and its English translation from WIPO.

Office Action dated Dec. 21, 2021 for Japanese Patent Application No. 2020-544719 and its English translation from Global Dossier.

Office Action dated Oct. 11, 2021 for Chinese Patent Application No. 201880083618.5 and its English translation provided by Applicant's foreign counsel.

Extended European Search Report dated Jul. 23, 2021 for European Patent Application No. 18872795.2.

* cited by examiner

FLOWERPOT

CROSS-REFERENCE TO RELATED APPLICATIONS

This application is the U.S. national phase of International Patent Application No. PCT/KR2018/011663 filed on Oct. 1, 2018, which claims the priority to Korean Patent Application No. 10-2017-0145835 filed in the Korean Intellectual Property Office on Nov. 3, 2017, the entire contents of which are incorporated herein by reference.

TECHNICAL FIELD

The present disclosure relates to a flowerpot capable of self-watering.

BACKGROUND ART

One of the most important factors in plant growth is moisture. Therefore, as for planting plants, it is important to prevent the difficulty, which may occur in the growth of the plant, by securing a watering system in advance.

Accordingly, in recent years, researches have been conducted to reduce time and labor caused by watering work, and among the research, there is a method of collecting moisture in the air and supplying water corresponding to the collected moisture to plants.

Korean Patent Registration No. 10-1388951 discloses a watering system configured to supply water to plants using moisture in the air.

However, the watering system disclosed in the above patent document is a large system in which a structure for collecting moisture in the air, a structure for storing the collected water, and a structure for supplying the stored water to the plants are provided separately from plant cultivators, and thus the watering system has the complicated structure, which may cause the difficulty when being applied to an individual flowerpot.

DISCLOSURE

Technical Problem

The present disclosure is directed to providing a flowerpot capable of self-watering and capable of simplifying a configuration for the self-watering.

Further, the present disclosure is directed to providing a flowerpot capable of self-watering, capable of increasing growth efficiency of planted plant and capable of purifying the surrounding air.

Technical Solution

One aspect of the present disclosure provides a flowerpot including a main body configured to provide a planting space in which an upper portion is open and a central portion is passed through by a through portion in a front and rear direction, a self-watering module installed in the through portion to form water by condensing moisture in the air, and a water supply hole provided on a bottom of the through portion so as to guide the water formed by the self-watering module to the planting space provided in a lower side of the through portion.

A bottom of the planting space may be provided in such a way that a lower side of the through portion is higher than opposite sides of the lower side of the through portion.

The bottom of the planting space provided in the lower side of the through portion may be formed in an arc shape.

The self-watering module may include a thermo element, a cooling member provided in a cooling portion of the thermo element, a heat radiating member provided in a heat radiating portion of the thermo element, and a cooling fan configured to cool the heat radiating member.

The cooling member may include a cooling plate, and a plurality of cooling fins protruding from the cooling plate, and the self-watering module may be installed in the through portion in such a way that the cooling fin is directly above the water supply hole.

The planting space in an upper side of the through portion may communicate with the through portion, and the self-watering module may be installed in the through portion in such a way that the cooling member is directed to the bottom of the through portion and air, which is blown by the cooling fan, is guided to the planting space in the upper side of the through portion.

The planting space may include an upper planting space provided in the upper side of the through portion, a pair of side planting spaces provided in opposite sides of the through portion, and a lower planting space provided in the lower side of the through portion, and a bottom of the upper planting space provided in the upper side of the through portion may be provided in such a way that a central portion of the bottom is higher than opposite portions of the bottom.

The bottom of the upper planting space provided in the upper side of the through portion may be formed in an arc shape.

The flowerpot may further include a wick provided in such a way that one end of the wick is in contact with the cooling member and the other end of the wick extends to the planting space through the water supply hole.

Advantageous Effects

The flowerpot may perform self-watering and simplify a configuration for self-watering because a self-watering module configured to perform self-watering is integrally formed with a main body.

Because the flowerpot allows air to flow to a planting space by a self-watering module, the flowerpot may promote the respiratory action of the plant roots. In addition, because the flowerpot allows air in the vicinity of the flowerpot to pass through a planting space and to circulate, the flowerpot may increase the growth efficiency of the planted plant, and purify the surrounding air as well as performing self-watering.

MODES OF THE INVENTION

The disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Throughout the drawings, to clarify the disclosure, a part irrelevant to the description may be omitted, and the size of components may be exaggerated to help understanding.

As illustrated in FIGS. 1 to 6, according to one embodiment, a flowerpot 1 includes a main body 10 in which soil is contained for planting a plant, and a self-watering module 20 installed integrally with the main body 10 to supply water to the soil in which a plant 2 is planted.

Because the self-watering module 20 configured to perform self-watering is installed integrally with the main body 10, the flowerpot 1 may perform self-watering and simplify a configuration for the self-watering.

Figure 1:
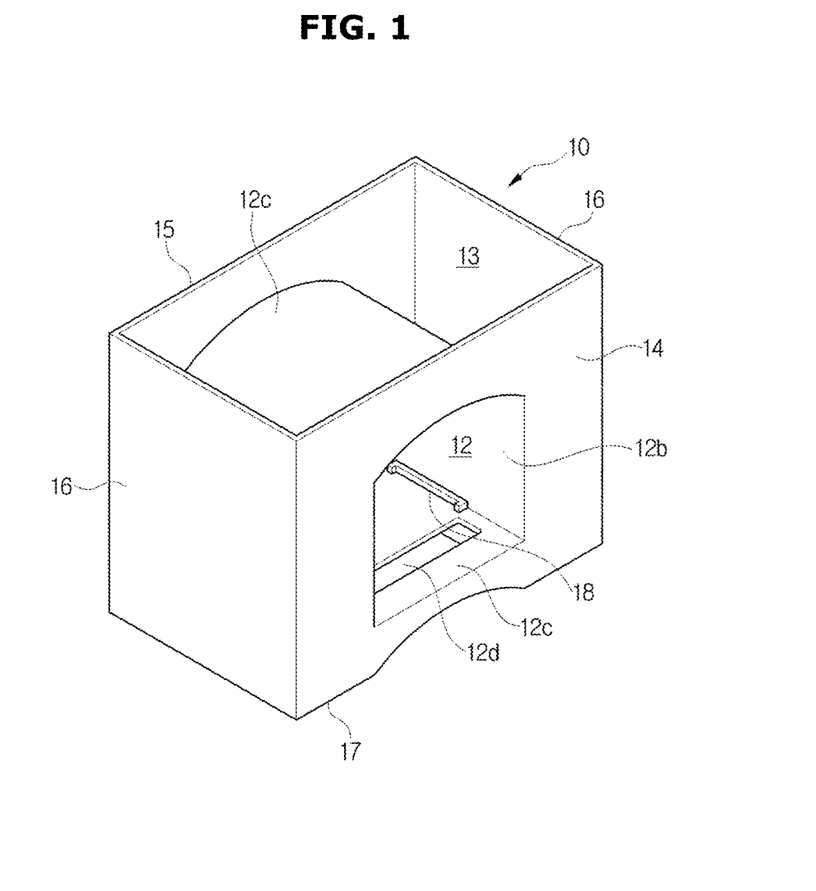
FIG. 1 is a perspective view of a main body of a flowerpot according to one embodiment of the present disclosure.

The main body 10 provides a planting space 13 in which an upper portion is open and a central portion is passed through in a front and rear direction by a through portion 12.

The main body 10 may be formed in a rectangular prism with an open top by including a front plate 14, a back plate 15, a pair of side plates 16 configured to cover both sides between the front plate 14 and the back plate 15, and a bottom plate 17 configured to cover a lower portion between the front plate 14 and the back plate 15.

The through portion 12 may be provided to pass through a central portion of the front plate 14 and the back plate 15. For this, a hole may be formed on the central portion of the front plate 14 and the back plate 15 and a rim of the holes may be connected to each other through a plurality of shielding plates 12a, 12b and 12c. Therefore, the through portion 12 may form a space penetrating the main body 10 in the front and rear direction while the through portion 12 is separated from the planting space 13 through the plurality of shielding plates 12a, 12b and 12c.

The planting space 13 may be formed in an approximate "☐" shape by including an upper planting space 13a provided in an upper side of the through portion 12, a pair of side planting spaces 13b provided in opposite sides of the through portion 12, and a lower planting space 13c provided in a lower side of the through portion 12.

In accordance with the planting space 13 having "☐" shape, the shielding plate 12c forming a bottom of the upper planting space 13a provided in an upper side of the through portion 12 may have an arch shape to allow a root 2a of the plant 2, which is planted in the planting space 13, to grow evenly across the planting space 13.

That is, because the bottom of the upper planting space 13a has the arc shape, the root 2a of the plant 2, which is planted in the planting space 13, may grow and be branched into the side planting spaces 13b, provided in the opposite sides of the through portion 12, by the arc shaped bottom of the upper planting space 13a. Therefore, it is possible to increase the space utilization of the planting space 13 provided in "☐" shape.

However, the shape of the bottom of the upper planting space 13a is not limited to an arch shape. The shape of the bottom of the upper planting space 13a may vary as long as a central portion of the bottom of the upper planting space 13a provided in an upper side of the through portion 12 is higher than opposite side portion of the upper planting space 13a so as to guide the root 2a of the plant 2, which is planted in the planting space 13, to the lower portion of the side planting spaces 13b.

Figure 2:
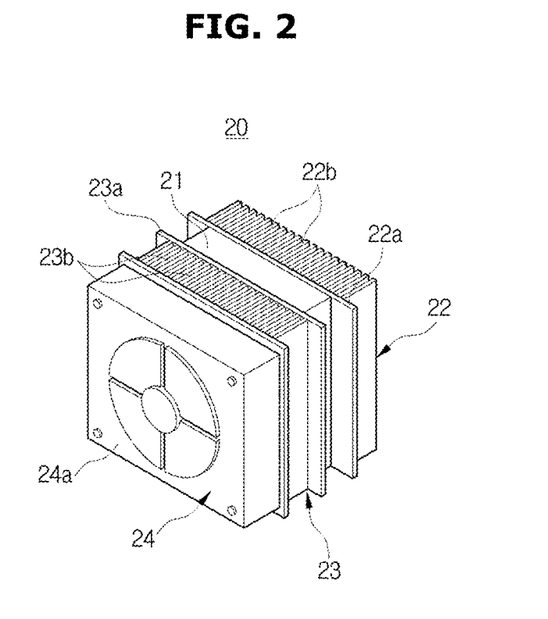
FIG. 2 is a perspective view of a self-watering module.

The self-watering module 20 is configured to produce water by condensing moisture in the air. The self-watering module 20 may be formed as one piece with the main body 10 in a state in which the self-watering module 20 is installed in the through portion 12 for sufficient communication with the air.

The self-watering module 20 may include a thermo element 21, a cooling member 22 provided in a cooling portion of the thermo element 21, a heat radiating member 23 provided in a heat radiating portion of the thermo element 21, and a cooling fan 24 configured to cool the heat radiating member 23.

The thermo element 21 is an element in which two different metals are combined or an N-type semiconductor and a P-type semiconductor are mutually bonded, and the thermo element 21 has the characteristic of endothermic reaction and exothermic reaction on both metal surfaces when DC current is applied. One surface of the thermo element 21 in which the endothermic reaction occurs may form the cooling portion, and the other surface of the thermo element 21 in which the exothermic reaction occurs may form the heat radiating portion.

The cooling member 22 and the heat radiating member 23 may be formed of a metal having the high thermal conductivity such as aluminum. The cooling member 22 and the heat radiating member 23 may be mounted to the cooling portion and the heat radiating portion, respectively. The cooling fan 24 may be mounted to the heat radiating member 23 to cool the heat radiating member 23 when the heat radiating member 23 is driven. Therefore, the self-watering module 20 may be provided as a single piece in which the thermo element 21, the cooling member 22, the heat radiating member 23 and the cooling fan 24 are integrally connected to each other.

The cooling fan 24 may include a fan casing and 24a, and a blowing fan 24b installed in the inside of the fan case 24a. A power cable (not shown) or a battery (not shown) for applying power may be connected to the thermo element 21 and the cooling fan 24.

The cooling member 22 may include a cooling plate 22a in contact with the thermo element 21 and a plurality of cooling fins 22b protruding from the cooling plate 22a. The heat radiating member 23 may include a heat radiating plate 23a mounted to the thermo element 21 and a plurality of a heat radiating fin 23b protruding from the heat radiating plate 23a.

Therefore, when the thermo element 21 and the cooling fan 24 are driven, the cooling member 22 may be cooled by a heat absorbing portion in which the endothermic reaction occurs, and the heat radiating member 23 may radiate heat by being cooled by the cooling fan 24. Accordingly, moisture in the air may be condensed on a surface of the cooling member 22 and thus water may be formed.

Figure 4:
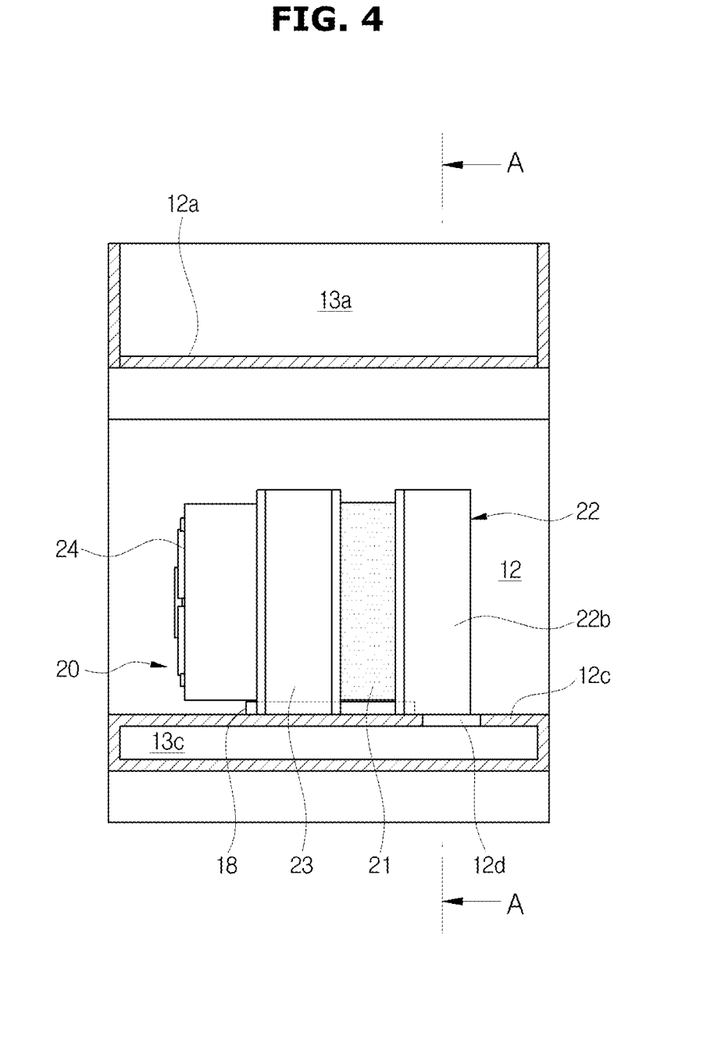
FIG. 4 is a cross-sectional view of the flowerpot of FIG. 3.
Figure 5:
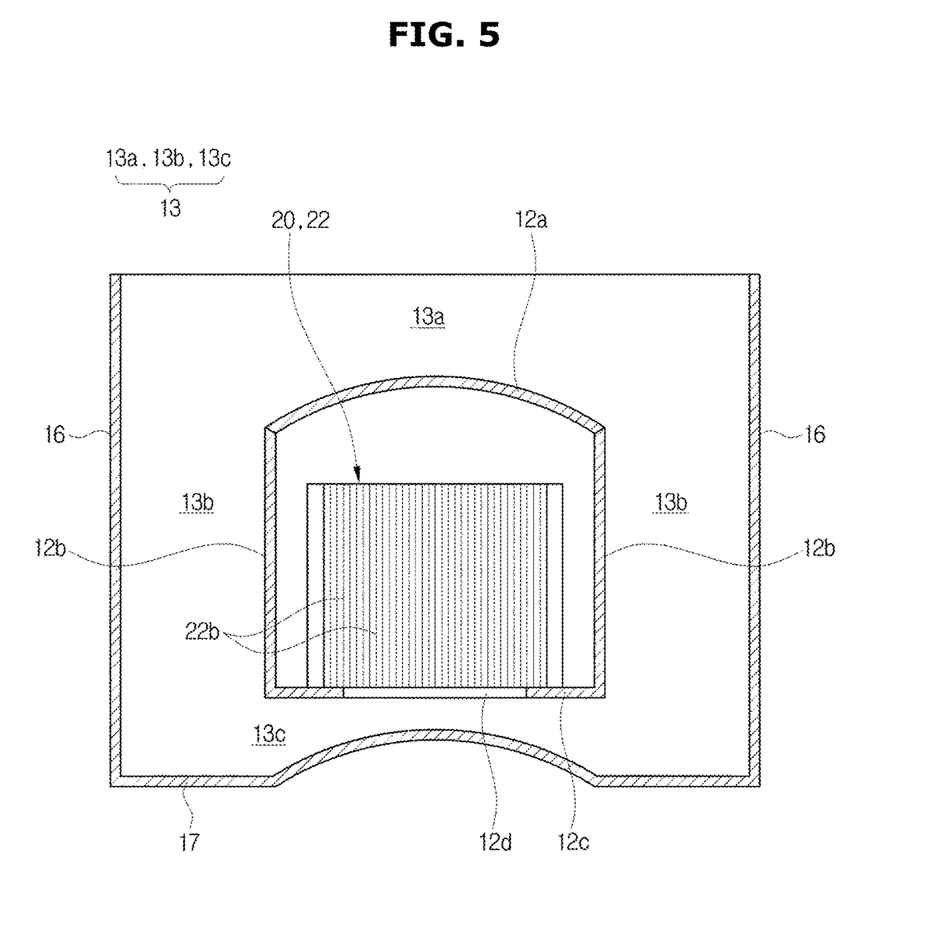
FIG. 5 is a cross-sectional view taken along line A-A of FIG. 4 when viewed from an arrow direction.

The water condensed on the surface of the cooling member 22 may fall to the lower side by its own weight and thus, in order to guide the condensed water to the lower planting space 13c, a water supply hole 12d may be provided on the bottom of the through portion 12. The water supply hole 12d may be provided on one side of the shielding plate 12c, which forms the bottom of the through portion 12, to penetrate the shielding plate 12c.

In the '☐' shaped planting space 13, the soil, which is filled from the upper portion of the planting space to the inside of the plating space, is mainly filled in the side planting spaces 13b and the upper planting space 13a rather than the lower planting space 13c. Therefore, it is appropriate that a central portion of the bottom plate 17 forming the bottom of the lower planting space 13c provided in the lower side of the through portion 12 has an arc shape to easily guide water, which is supplied to the lower planting space 13c, to the side planting spaces 13b provided in the opposite sides of the through portion 12.

The shape of the bottom of the lower planting space 13c is not limited to an arch shape. The shape of the bottom of the lower planting space 13c may vary as long as the lower side of the through portion 12 is higher than opposite sides of the lower side of the through portion 12 to guide water, which is guided to the lower planting space 13c, to the lower portion of the side planting space 13b provided in the opposite sides of the through portion 12.

Therefore, the water, which is guided to the lower planting space 13c through the water supply hole 12d, may be guided to the lower portion of the side planting spaces 13b provided in the opposite sides of the through portion 12, by the bottom of the lower planting space 13c provided in the arc shape. The water may be absorbed to the soil 3 and then transferred to the upper planting space 13a by the capillary action of the soil 3.

Figure 3:
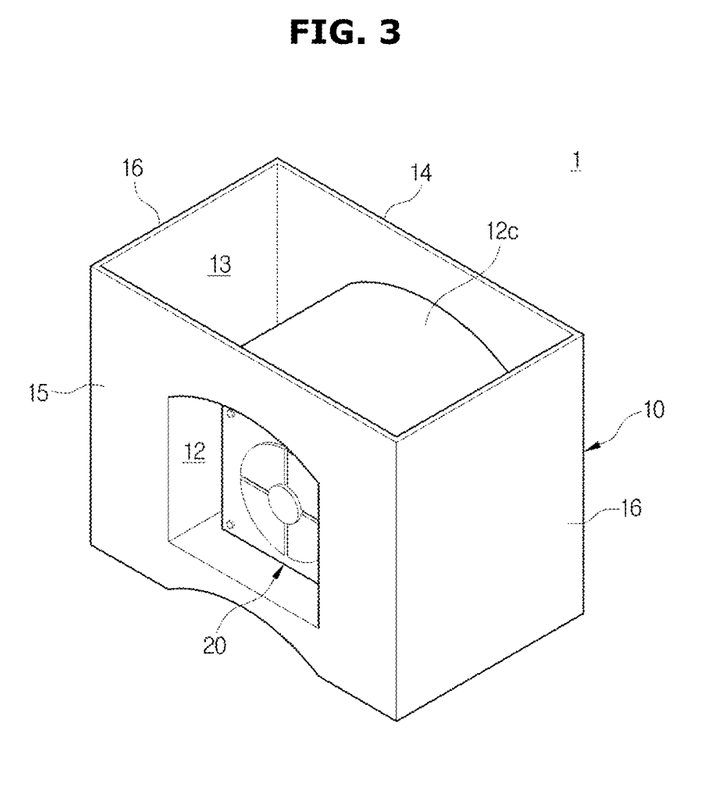
FIG. 3 is a perspective view of the flowerpot according to one embodiment, particularly illustrating a state in which the self-watering module is assembled to the main body.

The self-watering module 20 may be installed to the through portion 12 in such a way that the cooling member 22 and the cooling fan 24 are directed to the opposite sides of the through portion 12 that is open.

In addition, the self-watering module 20 may be installed in the through portion 12 in such a way that the cooling fin 22b is positioned directly above the water supply hole 12d so to allow the water formed on the surface of the cooling member 22 to be easily supplied to the water supply hole 12d.

In the shielding plate 12c forming the bottom of the through portion 12, a support 18 configured to support the self-watering module 20 may be installed at one side of the water supply hole 12d. The self-watering module 20 may be installed in such a way that the cooling fin 22b of the cooling member 22 is positioned directly above the water supply hole 12d in a state in which the opposite sides of the lower portion of the self-watering module 20 is supported by the support 18. In this state, the self-watering module 20 may be fixed to the through portion 12 through a fastening means such as a fixing bolt or an adhesive.

The cooling fin 22b may protrude from one surface of the cooling plate 22a while the cooling fin 22b elongates in the vertical direction of the cooling member 22. In addition, the plurality of the cooling fin 22b may be spaced apart from each other in the width direction of the cooling plate 22a.

Therefore, the water condensed on the surface of the cooling fin 22b may be guided to the lower portion of the cooling fin 22b by its own weight along the surface of the cooling fin 22b and then the guided water may be dropped to the water supply hole 12d and supplied to the planting space 13.

Figure 6:
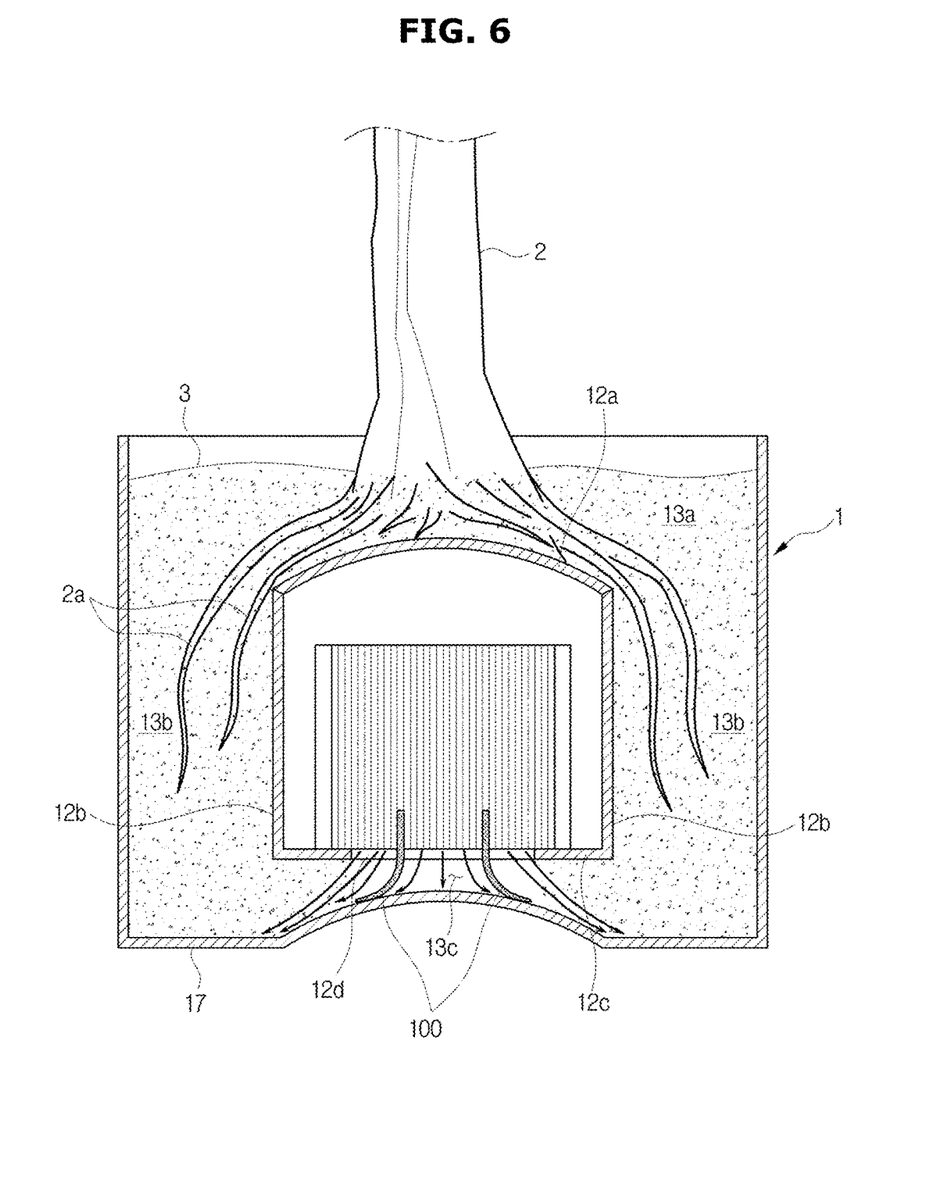
FIG. 6 is a cross-sectional view illustrating an operating state of the flowerpot according to one embodiment.

As the flowerpot 1 configured as described above drives the self-watering module 20 in a state in which the soil 3 is filled in the planting space 13 and the plant 2 is planted in the planting space 13, the thermo element 21 and the cooling fan 24 are driven and the cooling member 22 may be cooled by the heat absorbing portion in which the endothermic reaction occurs.

When the heat-radiating member 23 is cooled by the cooling fan 24 and radiates heat, the moisture in the air is condensed on the surface of the cooling member 22 and the water is formed.

The water generated on the surface of the cooling member 22 may be guided to the lower side along the surface of the cooling fin 22b, dropped into the water supply hole 12d by its own weight, and supplied to the lower planting space 13c. Continuously, the water may be guided to the lower portion of the side planting spaces 13b by the bottom of the lower planting space 13c having the arc shape and supplied to the soil 3. The water supplied to the soil 3 may be transferred to the upper portion of the side planting spaces 13b and the upper planting space 13a by the capillary action of the soil 3 and absorbed by the root 2a of the plant 2.

In addition, at this time, the condensed water on the surface of the cooling member 22 may be more quickly transferred to the planting space 13 using a wick 100.

The wick 100 may be installed in such a way that one end of the wick 100 is in contact with the cooling member 22 and the other end of the wick 100 extends to the lower planting space 13c through the water supply hole 12d. Further, the one end of the wick 100 that is inserted into the cooling fin 22b may be supported by the cooling member 22 and the wick 100 may extend to the lower portion of the side planting spaces 13b.

Accordingly, the water formed on the cooling fin 22b of the cooling member 22 may be transferred to the planting space 13 through the wick 100 before falling by its own weight.

The wick 100 may be replaced with various other media, which is capable of absorbing and delivering moisture, such as soil, and the water formed in the cooling fin 22b may be also transferred directly to the side planting spaces 13b through the media.

For example, in FIG. 6, a solid arrow indicated on the lower planting space 13c indicates a direction of water flow that passes through the water supply hole 12d and then guided to the lower portion of the side planting spaces 13b provided in the opposite side of the through portion 12.

Figure 7:
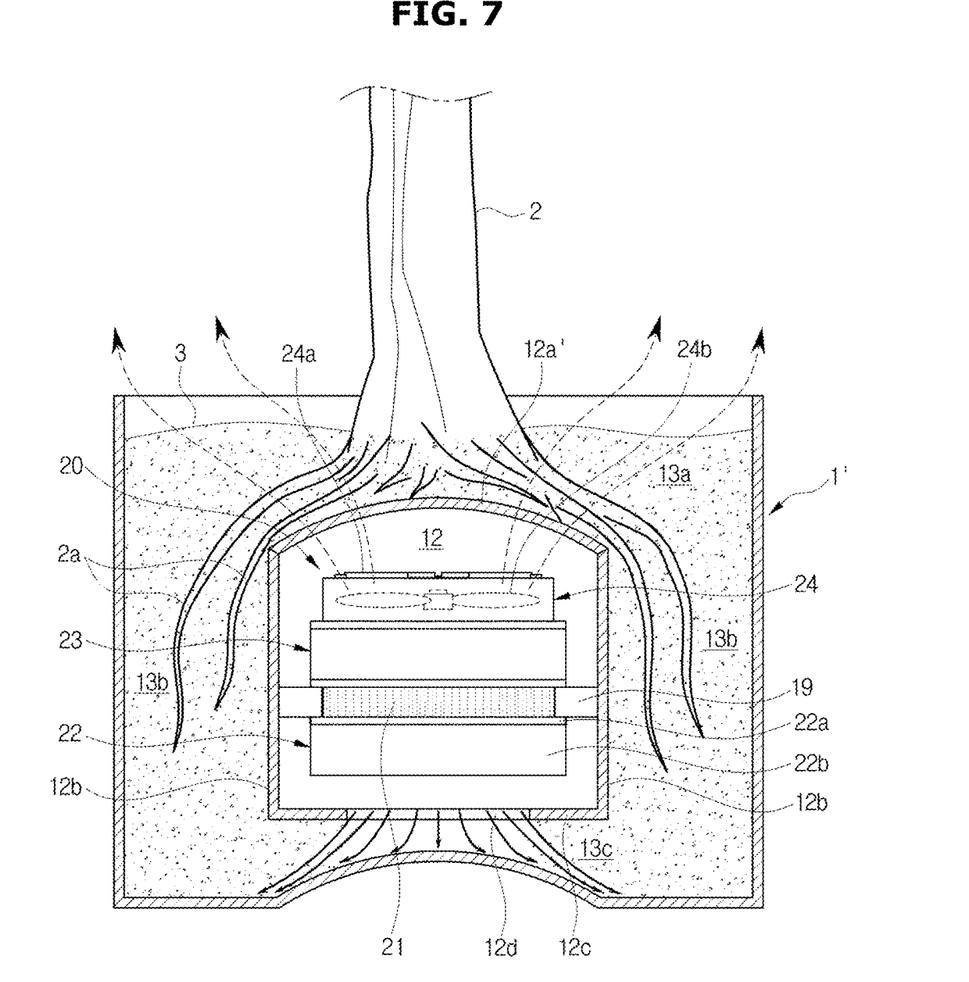
FIG. 7 is a cross-sectional view illustrating a modified flowerpot according to one embodiment, particularly illustrating an operating state of the modified flowerpot.

In a modified example according to one embodiment, as illustrated in FIG. 7, a flowerpot 1' may be provided in such a way that the upper planting space 13a positioned above the through portion 12 communicates with the through portion 12. The self-watering module 20 may be installed to the through portion 12 in such a way that the cooling member 22 is directed to the bottom of the through portion 12 and air, which is blown by the cooling fan 24, is guided to the upper planting space 13a positioned above the through portion 12.

The shielding plate 12a' forming the bottom of the upper planting space 13a may be provided in the form of mesh having a plurality of fine holes, so as to allow the communication of the air while blocking the soil 3.

In addition, the self-watering module 20 may be provided as the above-mentioned manner, except the position of the installation in which the cooling member 22 is directed to the lower side and the cooling fan 24 is directed to the upper side.

In the drawings, reference numeral 19, which is not described above, represents a support configured to support the self-watering module 20 installed in the through portion 12 to allow the cooling member 22 to be directed to the lower side.

The flowerpot 1' having the above mentioned configuration may perform an operation, which includes forming water by condensing moisture in the air through the cooling member 22, and transferring the water to the planting space 13 through the water supply hole 12d, in the similar manner as the above-mentioned flowerpot 1.

During the operation of the self-watering module 20, the air, which is blown by the cooling fan 24, may be transferred to the upper planting space 13a through the fine hole on the bottom of the upper planting space 13a. The air may supply oxygen to the root 2a of the plant 2 plated in the flowerpot 1', thereby promoting respiration of the root 2a and improving the growth of the plant 2.

In addition, the air flow, which passes through the upper planting space 13a and circulates by the blowing action of the cooling fan 24, may be formed and thus it is possible to purify the surrounding air by the flowerpot 1'.

That is, in the process in which the air around the flowerpot 1' passes through the planting space 13, some of pollutants in the air may be removed due to adsorption or absorption by the soil 3, and the other of pollutants may be used as the nutrient source of the microorganisms in the root area and then removed. Therefore, it is possible to purify the air around the flowerpot 1' because the air flow, which passes through and the planting space 13 and circulates, is formed by the driving of the self-watering module 20.

For reference, a solid arrow indicated on the lower planting space 13c in FIG. 7 indicates the direction of water flow guided to the bottom of the side planting space 13b through the water supply hole 12d, and a dotted arrow on the upper planting space 13a indicates the direction of the air flow passing through the upper planting space 13a.

The invention claimed is:

1. A flowerpot comprising:
a main body having a planting space in which an upper portion is open and a central portion is passed through by a through hole, wherein the through hole is covered by a plurality of shielding plates including upper and lower shielding plates, a front and a rear of the through hole are open, the upper shielding plate is positioned between the open upper portion of the planting space and the through hole, and the lower shielding plate is positioned between the through hole and a bottom of the main body so that the planting space is formed under the through hole to be at least partially filled with soil under the through hole;
a self-watering module installed in the through hole to form water by condensing moisture in the air; and
a water supply hole provided at the lower shielding plating covering a bottom of the through hole to guide the water formed by the self-watering module to the soil filled in the planting space provided between the bottom of the through hole and the bottom of the main body.

2. The flowerpot of claim 1, wherein
a bottom of the planting space is provided in such a way that a lower side of the through hole is higher than opposite sides of the lower side of the through hole.

3. The flowerpot of claim 2, wherein
the bottom of the planting space provided in the lower side of the through hole is formed in an arc shape.

4. The flowerpot of claim 1, wherein
the self-watering module comprises
a thermo element;
a cooling member provided in a cooling portion of the thermo element;
a heat radiating member provided in a heat radiating portion of the thermo element; and
a cooling fan configured to cool the heat radiating member.

5. The flowerpot of claim 4, wherein
the cooling member comprises
a cooling plate; and
a plurality of cooling fins protruding from the cooling plate,
wherein the self-watering module is installed in the through hole in such a way that the cooling fins are directly above the water supply hole.

6. The flowerpot of claim 4, wherein
the planting space in an upper side of the through hole communicates with the through hole,
wherein the self-watering module is installed in the through hole in such a way that the cooling member is directed to the bottom of the through hole and air, which is blown by the cooling fan, is guided to the planting space in the upper side of the through hole.

7. The flowerpot of claim 4, wherein
the planting space comprises
an upper planting space provided in the upper side of the through hole;
a pair of side planting spaces provided in opposite sides of the through hole; and
a lower planting space provided in the lower side of the through hole,
wherein a bottom of the upper planting space provided in the upper side of the through hole is provided in such a way that a central portion of the bottom is higher than opposite portions of the bottom.

8. The flowerpot of claim 7, wherein
the bottom of the upper planting space provided in the upper side of the through hole is formed in an arc shape.

9. The flowerpot of claim 4, further comprising
a wick provided in such a way that one end of the wick is in contact with the cooling member and the other end of the wick extends to the planting space through the water supply hole.

10. The flowerpot of claim 1, wherein the upper shielding plate has a mesh shape having a plurality of holes to allow air flow and block passing the soil.

11. The flower pot of claim 1, wherein each of the upper shielding plate and the bottom of the main body includes an arc portion.

12. The flower pot of claim 1, wherein the planting space is formed by an inner surface of the main body and the plurality of shielding plates.

13. The flower pot of claim 1, wherein the open front and the open rear of the through hole are formed to face an inner side of the flowerpot.

14. The flower pot of claim 1, wherein a plane of the open upper portion of the planting space of the main body is perpendicular to planes of the open front and the open rear of the through hole.

15. The flower pot of claim 1, wherein the open upper portion of the planting space of the main body is formed at an upmost part of the main body and the bottom of the main body is a lowest part of the main body.

* * * * *